US008015375B1

(12) United States Patent
Gulve et al.

(10) Patent No.: US 8,015,375 B1
(45) Date of Patent: Sep. 6, 2011

(54) METHODS, SYSTEMS, AND COMPUTER PROGRAM PRODUCTS FOR PARALLEL PROCESSING AND SAVING TRACKING INFORMATION FOR MULTIPLE WRITE REQUESTS IN A DATA REPLICATION ENVIRONMENT INCLUDING MULTIPLE STORAGE DEVICES

(75) Inventors: Somnath A. Gulve, Morrisville, NC (US); David Haase, Fuquay Varina, NC (US); Milind Koli, Durham, NC (US)

(73) Assignee: EMC Corporation, Hopkinton, MA (US)

( * ) Notice: Subject to any disclaimer, the term of this patent is extended or adjusted under 35 U.S.C. 154(b) by 351 days.

(21) Appl. No.: 11/731,775

(22) Filed: Mar. 30, 2007

(51) Int. Cl.
*G06F 12/00* (2006.01)

(52) U.S. Cl. ......... 711/162; 711/111; 711/161; 711/168

(58) Field of Classification Search .................. 711/111, 711/168, 161, 162
See application file for complete search history.

(56) References Cited

U.S. PATENT DOCUMENTS

| | | | | |
|---|---|---|---|---|
| 6,154,852 A * | 11/2000 | Amundson et al. | ................ | 714/5 |
| 7,096,331 B1 | 8/2006 | Haase et al. | | |
| 7,539,823 B2 * | 5/2009 | Kakeda | .......................... | 711/141 |
| 7,620,786 B2 * | 11/2009 | El-Batal et al. | ............... | 711/162 |
| 7,620,789 B2 | 11/2009 | Jeddeloh | | |
| 7,702,670 B1 * | 4/2010 | Duprey et al. | ................. | 707/646 |
| 7,925,796 B1 * | 4/2011 | Bailey et al. | ....................... | 710/5 |
| 2006/0059317 A1 * | 3/2006 | Kakeda | .......................... | 711/145 |
| 2006/0242367 A1 | 10/2006 | Ramakrishnan et al. | | |
| 2007/0079088 A1 | 4/2007 | Deguchi et al. | | |
| 2008/0183988 A1 | 7/2008 | Qi | | |

OTHER PUBLICATIONS

Final Official Action for U.S. Appl. No. 11/799,847 (Jun. 22, 2010).
Non-Final Official Action for U.S. Appl. No. 11/799,847 (Nov. 17, 2009).
Final Official Action for U.S. Appl. No. 11/799,847 (Jun. 25, 2009).
Interview Summary for U.S. Appl. No. 11/799,847 (Feb. 12, 2009).

(Continued)

*Primary Examiner* — Mardochee Chery
(74) *Attorney, Agent, or Firm* — Jenkins, Wilson, Taylor & Hunt, P.A.

(57) ABSTRACT

A method of parallel processing and storing tracking information for multiple write requests in a data replication environment including multiple data storage devices is disclosed. According to one aspect, the method includes receiving a plurality of first write requests to write data to the source in a data storage environment having a first volume of data denominated as a source being stored on a data storage system and at least a second volume of data denominated as a clone and which has data content that is a copy of data content of the source, the clone being stored on the data storage system or on another data storage system. Tracking information is saved to persistent storage representing differences in data located on the source and data located on the clone indicated by the first write requests. Parallel writing of data is initiated, where the data to be written to the source and the clone is indicated by the first write requests. During the parallel writing of data indicated by the first write requests, tracking information is saved to the persistent data storage, the tracking information representing differences in data located on the source and data located on the clone as indicated by a plurality of second write requests.

23 Claims, 3 Drawing Sheets

OTHER PUBLICATIONS

Non-Final Official Action for U.S. Appl. No. 11/799,847 (Oct. 27, 2008).

Commonly-assigned, co-pending U.S. Appl. No. 11/799,847 for "Methods, Systems, and Computer Program Products for Performing an Input/Output (I/O) Operation that Includes a Virtual Drain," (Unpublished, filed May 3, 2007).

"Using EMC TimeFinder/Snap with Oracle9i Databases," Engineering White Paper, EMC Corporation, pp. 1-17 (Nov. 2005).

"EMC Virtual LUN Technology, A Detailed Review," White Paper, EMC Corporation (Sep. 2006).

Notice of Allowance and Fee(s) Due for U.S. Appl. No. 11/799,847 (Dec. 10, 2010).

* cited by examiner

METHODS, SYSTEMS, AND COMPUTER PROGRAM PRODUCTS FOR PARALLEL PROCESSING AND SAVING TRACKING INFORMATION FOR MULTIPLE WRITE REQUESTS IN A DATA REPLICATION ENVIRONMENT INCLUDING MULTIPLE STORAGE DEVICES

TECHNICAL FIELD

The subject matter described herein relates to processing and saving tracking information for write requests to data storage devices. More particularly, the subject matter described herein relates to methods, systems, and computer program products for parallel processing and saving tracking information for multiple write requests in a data replication environment including multiple data storage devices.

BACKGROUND

In computer systems, it may be desirable to store multiple copies of data at different storage locations for security and/or availability purposes. This type of data storage technology is hereinafter generally referred to as "data replication," and will be discussed in greater detail below. For example, in a data replication system including a source data storage location, such as a source disk, and one or more clone data storage locations, such as one or more clone disks, data stored on the source may be replicated to each of the clones in a variety of ways.

One conventional method for replicating data in a computer system includes a process referred to as "data mirroring." Data mirroring includes copying data located on a source disk to one or more clone disks so that in the event of a failure of the source disk, a current version of the data may be accessed by reading the data from any one of the available clone disks.

Another conventional data replication method includes mirroring data between a source and a clone until a user-defined point in time, hereinafter referred to as "a fracture" or "fracturing a clone," wherein data is no longer mirrored to the fractured clone. Fracturing a clone (i.e. ceasing to mirror data from a source to a clone at a point in time) may be performed, for example, for backup purposes, where source data that has been replicated to a fractured clone is said to be "backed-up." Backed-up data may be used, for example, to restore the data that existed on a source disk at the time of a fracture. For example, in a data replication system including a source disk and seven clone disks, a different clone may be fractured each day of the week so that, at any point in time, seven days worth of data is backed-up. Therefore, in the event of failure of the source disk, an operator may restore a snapshot-copy of the data on the source disk to any data as it existed on any day during the week preceding the backup restore.

It is appreciated, however, that in addition to ceasing the mirroring of data from a source to a clone at the time of a clone fracture, it may be desirable to record the memory locations of any changes made to the source disk after a fracture so that, in the event of a backup restore process, the minimum amount of data necessary to achieve accurate restoration of source data is restored. For example, in the system described above, the source and clone disks may each include multiple data extents or other logical units of data storage. Therefore, upon a fracture and subsequent change to a small minority of extents on the source disk, a log indicating whether an extent was changed after a fracture may record which extents were changed. This representation may be implemented, for example, by storing a binary value in a bitmap. By maintaining a record of changes made to the source, when a backup restore process is initiated, the record may be examined to determine the extents changed subsequent to the fracture so that only those extents may be copied back to the source. Alternately, in an implementation that does not include a record of changes made to the source as described above, during a backup restore process, the entire contents of the clone disk are copied to the source, including many redundantly identical extents. Because such a system introduces large and unnecessary inefficiencies during a backup restore process, many conventional data replication technologies employ some form of log as described above.

For purposes of the remaining discussion, it is assumed that a data replication system including a source and multiple clones is capable of being fractured and that a log of the changed extents is maintained. Furthermore, it is assumed that a plurality of write requests may be received simultaneously, where a write request is a request to record data to the source, which is replicated to one or more clones. It is further appreciated that the word "simultaneous" in this context includes near simultaneity (i.e. a burst of requests within a short time) as all operations executing in a computing environment are inherently executed in a sequential order at the physical level. One conventional method for processing multiple write requests includes imposing a sequential order upon the write requests by, for example, placing the write requests in a queue and executing each write request in the queue sequentially. In such an implementation, the execution of each write request may include writing data to an extent located on the source, as indicated by the write request, and subsequently, writing the data to the corresponding extents on each of the clones in sequence (i.e., serially). Thus, in a data replication system including x data storage devices (a source and x−1 clones) and y write requests, x*y logical operations are required in order to record the data indicated by y write requests to x data storage devices.

Another conventional method for executing multiple write requests also includes queuing the write requests. However, data indicated by each write request in the queue may be written to the source and replicated to the clones in parallel, thereby reducing the number of logical operations necessary to record the data indicated by the write requests to multiple data storage devices. Continuing the example discussed previously, wherein y write requests are received and directed toward data stored on x data storage devices, by writing to the source and its clones in parallel, only y operations are required in order to record to x data storage devices because data may be recorded simultaneously to x data storage devices for each write request.

One problem associated with conventional data replication systems is that performance in executing multiple write requests to an array of multiple data storage devices degrades as the number of simultaneously received write requests is received. In other words, the performance of conventional data replication systems does not scale with the number of write requests received and therefore can become a performance bottleneck in environments where a large number of write requests are received.

Another problem associated with conventional data replication systems is that recording tracking information regarding the extents to be changed by a given set of write requests may not be initiated until the data associated with the previous set of write requests has been written to the source and its clones. In other words, there is a synchronous relationship between the writing of data to the source and its clones for a first set of write requests and the logging of tracking information associated with a second set of write requests. This relationship creates a performance bottleneck associated with the processing and saving tracking information for multiple write requests to multiple data storage devices.

Accordingly, a need exists for improved methods, systems, and computer program products for improving the performance of data replication systems including multiple data storage devices and that receive multiple write requests.

SUMMARY

A method of parallel processing and storing tracking information for multiple write requests in a data replication environment including multiple data storage devices is disclosed. According to one aspect, the method includes receiving a plurality of first write requests to write data to the source in a data storage environment having a first volume of data denominated as a source being stored on a data storage system and at least a second volume of data denominated as a clone and which has data content that is a copy of data content of the source, the clone being stored on the data storage system or on another data storage system. Tracking information is saved to persistent storage representing differences in data located on the source and data located on the clone indicated by the first write requests. Parallel writing of data is initiated, where the data to be written to the source and the clone is indicated by the first write requests. During the parallel writing of data indicated by the first write requests, tracking information is saved to the persistent data storage, the tracking information representing differences in data located on the source and data located on the clone as indicated by a plurality of second write requests.

According to another aspect, a system for parallel processing and storing tracking information for multiple write requests in a data replication environment including multiple data storage devices is disclosed. The system includes a data storage system including a first volume of data denominated as a source being stored on a data storage system and a second volume of data denominated as a clone which has data content that is a copy of data content of the source being stored on the data storage system or on another data storage system. The system further includes a replication and persistent storage manager for receiving at least two write requests to write data to the source and saving, to persistent data storage separate from the source and the at least one clone, a representation of change to data located on the source indicated by a first subset including at least two of the received write requests. Persistent storage and replication manger, in parallel, initiate writing of data indicated by the first subset of the received write requests to the source that is replicated to the at least one clone and save a representation of changes to data located on the source indicated by a second subset of the received write requests to the persistent data storage prior to completing writing of the data indicated by the first subset of write requests.

The subject matter described herein for parallel processing and storing tracking information for multiple write requests in a data replication environment including multiple data storage devices may be implemented using a computer program product comprising computer executable instructions embodied in a computer-readable medium. Exemplary computer-readable media suitable for implementing the subject matter described herein include disk memory devices, programmable logic devices, application specific integrated circuits, and downloadable electrical signals. In addition, a computer-readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1:
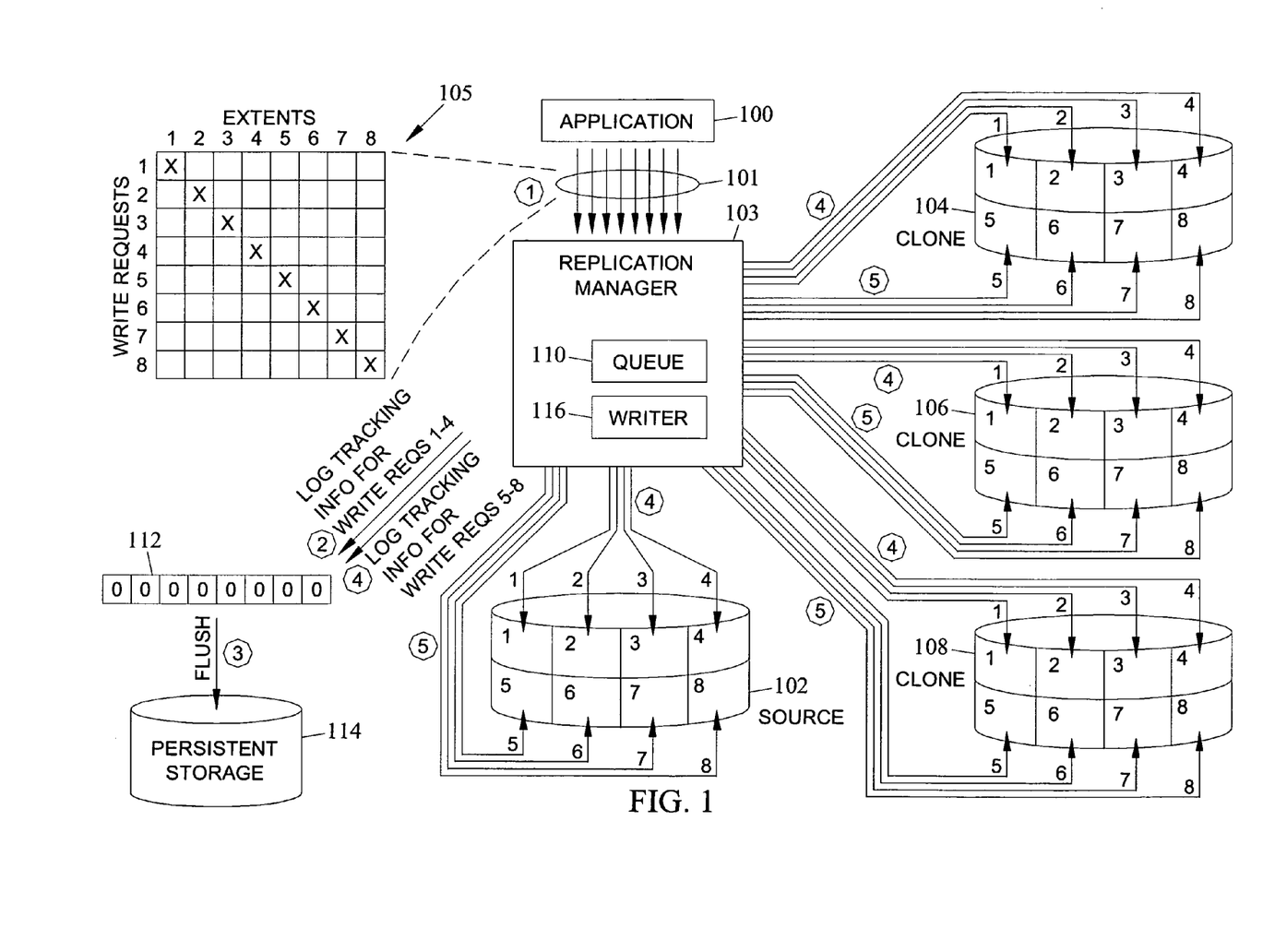
FIG. 1 is a diagram of an exemplary system for parallel processing and storing tracking information for multiple write requests to a source and replicating to multiple clones according to an embodiment of the subject matter described herein.

FIG. 1 is a diagram of an exemplary data replication system for processing a plurality of write requests in parallel according to the subject matter described herein. Referring to FIG. 1, application 100 may desire to write data to source 102, and the write may be automatically replicated to clones 104-108. Source 102 and clones 104-108 may reside on disks within the same disk array or in different disk arrays. Application 100 may write data to source 102 that may be replicated to one or more clones 104-108 by generating one or more write requests 101. Application 100 may be a computer program or a set of computer executable instructions executed by a processor, such as a central processing unit (CPU) or application specific integrated circuit (ASIC), and may be stored in software, hardware, firmware or any combination thereof. Write requests 101 may include computer-readable instructions for initiating the writing of data to a location on a disk array.

Source 102 and clones 104-108 may be stored on one or more physical data storage devices, such as one or more disks. Source 102 and clones 104-108 may be located on disks within a single local area network (LAN) and may be co-located with or geographically separated from each other. The data storage devices on which source 102 and clones 104-108 are stored will hereinafter be referred to as a "disk array" or a "disk array platform."

One commercially available example of a disk array and associated replication manager suitable for implementing the subject matter described herein is the CLARiiON® disk array platform available from EMC Corporation of Hopkinton, Mass. However, the subject matter described herein is not limited to the CLARiiON® platform. The methods described herein for preserving atomic writes to a disk array can be implemented on any platform that includes a disk array without departing from the scope of the subject matter described herein.

Write requests 101 may be received by replication manager 103 and queued in queue 110. Queue 110 may be configured to store one or more write requests awaiting processing. However, prior to processing write requests in queue 110 by writing data to source 102 and replicating the data to one or more clones 104-108, changes to be made to source 102 indicated by write requests 101 may be stored in one or more locations, such as bitmap 112 and persistent storage 114.

In FIG. 1, tracking information for write requests 101 may be stored in a data structure representing differences between source 102 and one or more clones 104-108. For example, representations of extents containing different data between source 102 and one or more clones 104-108 may be represented in a bitmap, where each bit in the map may include either a 1 indicating that data is different between a source and a clone, or a 0 indicating that no difference exists in the data located on source 102 and one or more clones 104-108. It is appreciated that while bitmap 112 is illustrated in FIG. 1, other data structures suitable for storing representations of differences in data may be used according to the subject matter described herein. It is further appreciated that bitmap 112 may be located in computer readable memory, such as random access memory (RAM) or other suitable format.

In order to provide additional security in the event that bitmap 112 becomes unavailable during a backup restore (i.e. restoring backed-up data from a clone to a source), the data located in bitmap 112 may be copied to persistent data storage, such as persistent storage 114. Persistent storage 114 may include any suitable data storage system, such as those described in reference to source 102 and clones 104-108 above.

Upon saving tracking information associated with write requests 101 to persistent storage 114, writer 116 may retrieve a first set of at least two write requests from queue 110 for processing. Processing multiple write requests may include initiating parallel writing of data indicated by the first set of write requests to source 102. Replication manager 103 may likewise initiate parallel writing of data corresponding to the first set of write requests to one or more of clones 104-108. However, it is appreciated that the completion of writing data to the source and the clone may not occur simultaneously. The process of writing data to source 102 and replicating to one or more clones 104-108 may be completed at different times for source 102 and clones 104-108 due to factors including, but not limited to, differences in the geographic location of source 102 and each of clones 104-108, and differences in the rate at which devices storing source 102 and clones 104-108 are capable of writing data.

Initiating parallel writing of data indicated by the first received write requests may be performed by writer 116 by utilizing multiple threads of execution for carrying out the instructions to write data to the source and replicate them to one or more clones 104-108 included in the first write requests. A thread of execution (hereinafter referred to as a "thread") includes computer-executable code which may be interpreted by an operating system for dividing a set of instructions into several smaller sets of instructions that may be executed in parallel, either simultaneously or pseudo-simultaneously, wherein threads may communicate with other threads by, for example, sharing state information, memory, and other resources related to the shared process.

It is further appreciated that data storage devices on which source 102 and clones 104-108 are stored, as illustrated in FIG. 1, each include eight data storage extents labeled 1-8. For ease of illustration, it is assumed that data storage extents on source 102 and clones 104-108 initially contain no data. However, source 102 and clones 104-108 may include any number of extents, logical units or other physical or logical data storage unit and may contain data prior to recording data indicated by a given set of write requests. However, as will be described in greater detail below with respect to FIG. 2, the contents of bitmap 112, persistent storage 114, and source 102 and clones 104-108 may be changed as a result of processing write requests 101.

Figure 2:
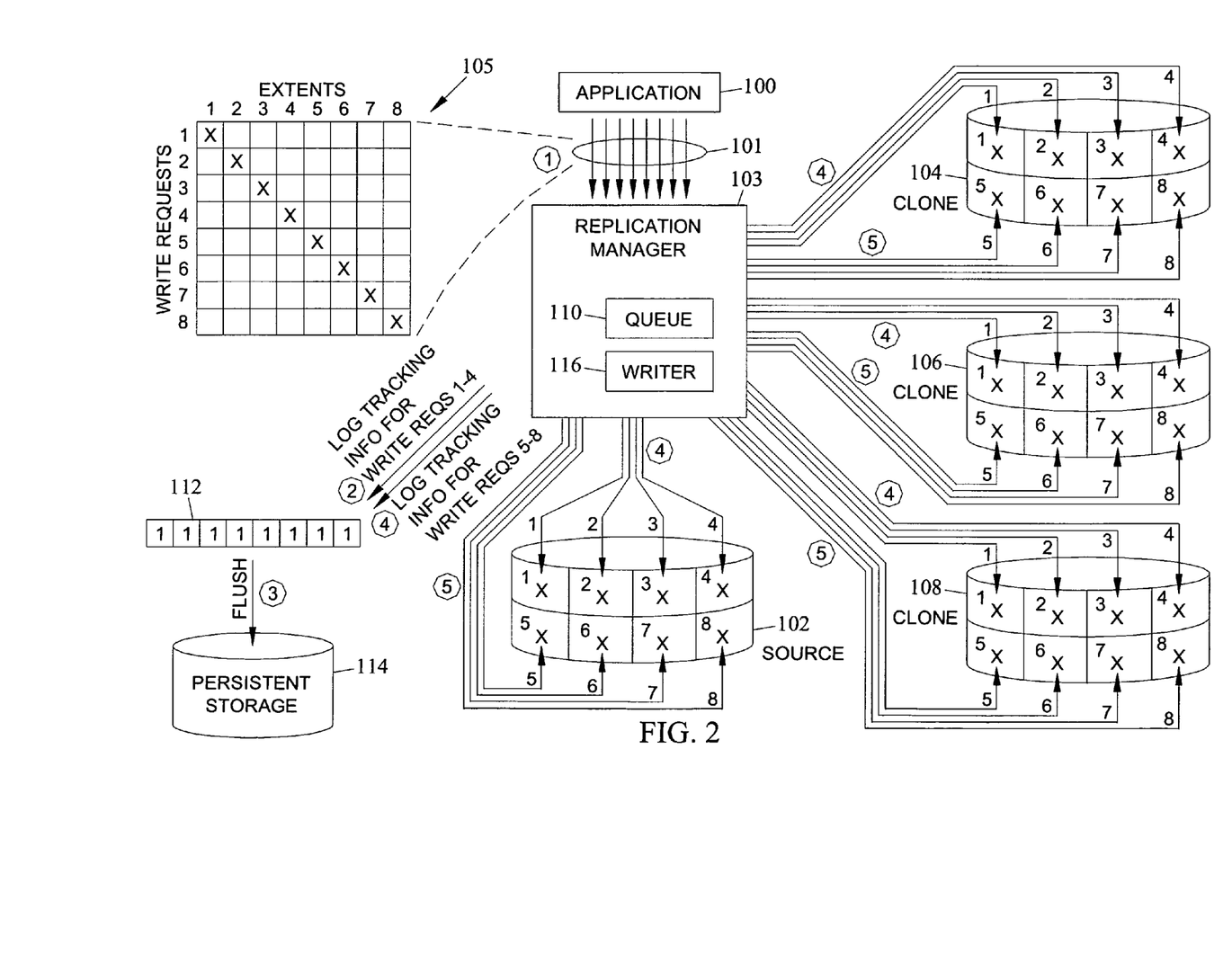
FIG. 2 is a diagram of the exemplary system in FIG. 1 subsequent to processing and storing tracking information for multiple requests according to an embodiment of the subject matter described herein.

FIG. 2 is a diagram of the data replication system in FIG. 1 subsequent to the processing of write requests 101 according to an embodiment of the subject matter described herein. For example, as described above, write requests 101 may be received by replication manager 103 and queued by queue 110. The changes to be made to source 102 and replicated to one of clones 104-108, as indicated by write requests 101, are collectively recorded in bitmap 112. As illustrated in FIG. 2, this includes changing the value of each bit in bitmap 112 from a 0 to a 1, indicating that write requests 101 collectively request writing data to extents 1 to 8 on disk arrays on which source 102 and clones 104-108 are stored. Bitmap 112 may then be flushed (i.e. copied) to persistent storage 114. After saving the changes indicated by write requests 101 persistently, writer 116 may retrieve a first set of one or more write requests from queue 110.

The number of write requests retrieved by writer 116 is independent of the number of threads available for writing the data to source 102 and replicating to clones 104-108. For example, referring to FIG. 2, writer 116 may retrieve five of the eight write requests located in queue 110. However, it is appreciated that the retrieval of five write requests is merely exemplary and that writer 116 may retrieve any number of write request from queue 110. In the embodiment illustrated in FIG. 2, it is assumed that four threads exist for the execution of write requests. Therefore, four of the five retrieved write requests may be processed by the four threads by writing data to extents 1-4 on source 102 and replicating the data to extents 1-4 on clones 104-108, as indicated by step 4. Writer 116 may also retrieve a plurality of second write requests from queue 110. For example, writer 116 may retrieve the remaining three write requests of the eight write requests located in queue 110 (i.e. write requests 6-8).

Upon writing data associated with write requests 1-4, the execution threads may begin writing data associated with a next set of write requests. In the scenario described above, if write requests 6-8 have been given to the execution threads before the threads have completed processing write requests 1-4, then write requests 6-8 may be processed along with write request 5. In this example, write request 5 was not processed in the previous operation because it is assumed that only four threads exist. Therefore, as illustrated by step 5, processing write requests 5-8 includes writing data to extents 5-8 on source 102 and replicating the data to extents 5-8 on clones 104-108.

Alternately, if write requests 6-8 were given to the four execution threads after a delay of some kind, a single thread may process write request 5 that was previously sent to the four execution threads along with write requests 1-4. In this situation, the three remaining threads remain idle during the processing of write request 5. Then, upon receiving write requests 6-8, three available threads may process write requests 6-8. The result of this scenario is identical to that of the scenario described above, namely, that data is written to extents 5-8 on source 102 and replicated to extents 5-8 on clones 104-108. However, rather than writing the data indicated by the eight write requests in two operations of four write requests each, the data is written in three operations of four write requests, one write request, and three write requests.

While completing the process of writing data to source 102 and clones 104-108 indicated by the first set of write requests (i.e. write requests 1-4), replication manager 103 may persistently log tracking information for a second set of write requests, such as write requests 5-8. This differs from conventional data replication systems which require that data associated with a first set of write requests be written to each of source 102 and clones 104-108 prior to initiating the logging of tracking information for a next set of write requests.

Figure 3:
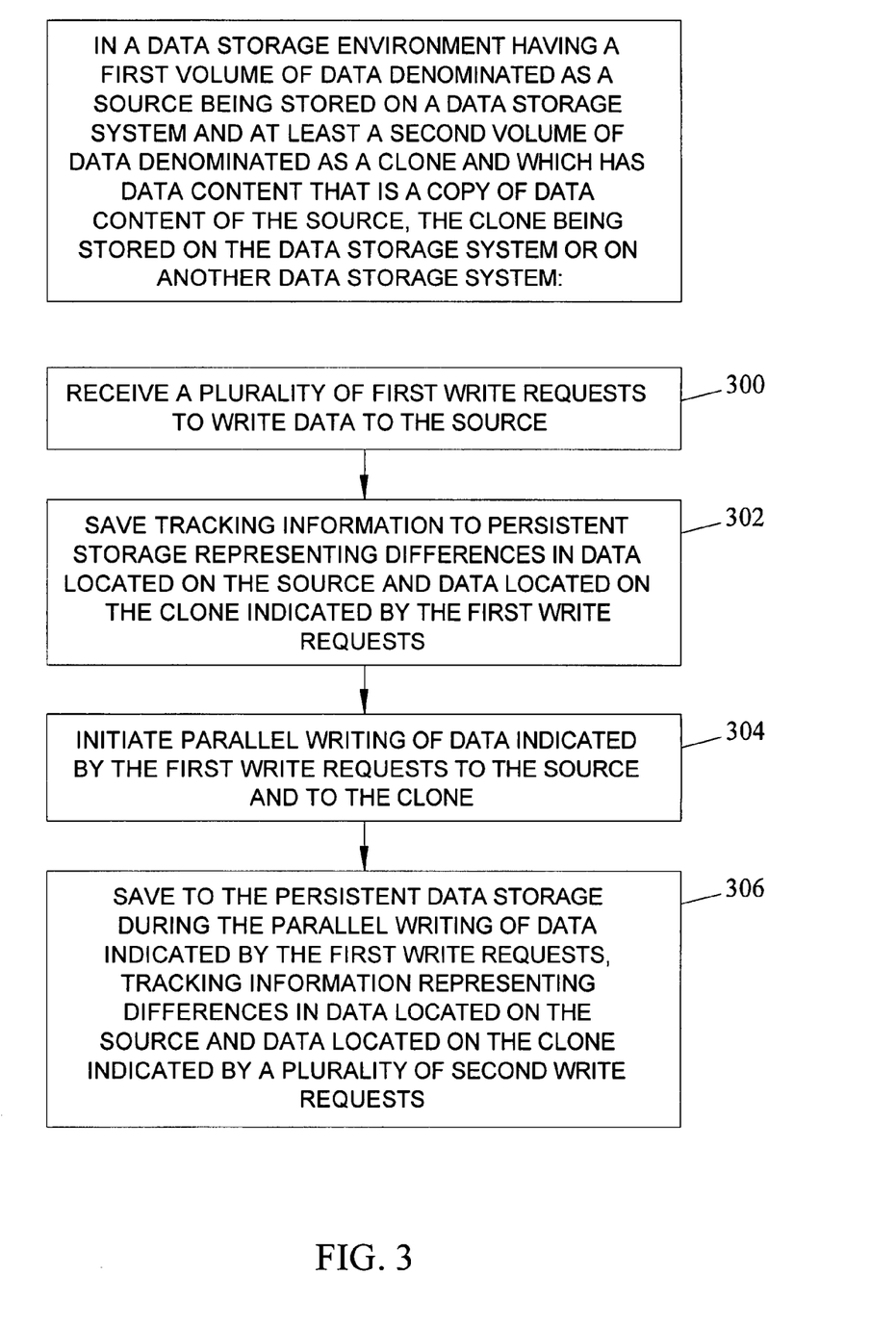
FIG. 3 is a flow chart of a process for parallel processing and storing tracking information for multiple write requests in a data replication environment including multiple data storage devices according to an embodiment of the subject matter described herein.

FIG. 3 is a flow chart of a process for parallel processing and storing tracking information for multiple write requests in a data replication environment including multiple data storage devices according to an embodiment of the subject matter described herein. As illustrated in FIGS. 1 and 2, the method described in FIG. 3 may be performed in a data storage environment having a first volume of data denominated as a source being stored on a data storage system and at least a second volume of data denominated as a clone and which has data content that is a copy of data content of the source, the clone being stored on the data storage system or on another data storage system. Referring to FIG. 3, in block 300, a plurality of first requests to write data to the source are received. In the example illustrated in FIG. 1, write requests 101 include eight write requests which are received by replication manager 103. Diagram 105 is a representation of write requests 101 and the data storage extents to which write requests 101 desire to write data to. For example, according to diagram 105, a first write request indicates a desire to write data "x" to extent 1 on source 102 that may be replicated to clones 104-108. Similarly, a second write request indicates a desire to write data "x" to extent 2 on source 102, which is replicated to each of data storage devices 104-108, and so on. Therefore, write requests 101 collectively desire to write data "x" to each extent 1-8 on source 102 and replicated to clones 104-108, where each write request is directed to a different extent. However, it is appreciated that write requests 101 may include instructions to write data to multiple extents on source 102, which may or may not overlap with extents indicated by other write requests.

In block 302, tracking information is saved to persistent storage, where the tracking information represents differences in data located on the source and data located on the clone indicated by the first write requests. For example, replication manager 103 may save tracking information for write requests 1-4 to bitmap 112 by changing the values of the first four bits in bitmap 112 from 0 to 1, where the first four bits in the bitmap correspond to the first four extents on source 102 and a value of 0 indicates that no difference exists between source 102 and one or more clones 104-108, while alternately, a value of 1 indicates that a difference exists.

Bitmap 112 may be copied to persistent storage, such as persistent storage 114. Persistent storage 114 may be any suitable non-volatile data storage medium which may include, for example, one or more hard disks or a LAN segregated from source 102 and one or more clones 104-108. Because bitmap 112 may be copied to persistent storage 114 in one logical operation, where bitmap 112 may include tracking information associated with multiple write requests, persistent logging performance for multiple write requests is improved over serial methods. Subsequent to persistently logging tracking information related to the first set of write requests, the first subset of at least two write requests may be processed.

In block 304, the data to be written to the source and replicated to the clone as indicated by the first write requests is initiated in parallel. For example, writer 116 may retrieve the first subset of write requests which, in the embodiment illustrated in FIGS. 1 and 2, includes write requests 1-4. Writer 116 may then utilize four threads to carry out the process of writing the data indicated by write requests 1-4 to source 102 and replicating to one or more clones 104-108. As described above, writer 116 may utilize multiple pre-existing threads dedicated to processing write requests or may generate (also referred to as "spawn") multiple threads dedicated to processing write requests 1-4. Spawned threads may automatically terminate upon completing their function so that new threads may be spawned. Additionally, the number of threads spawned may be adaptively and dynamically determined based on demand to write input/output (I/O) to the source, and may be balanced against other factors, such as the amount of available system resources and the amount of resources required to manage a given number of threads. For example, the number of threads may be increased during periods for which the number of write requests awaiting processing by the threads is large, and may be decreased during periods for which the number of write requests awaiting execution is small. This dynamic process may be further informed by one or more user-configurable values, such as a minimum and/or maximum number of threads that may exist, regardless of demand.

Regardless of the embodiment, it is appreciated that the process of writing data to source 102 and replicating to one or more clones 104-108 is not instantaneous and therefore while the initiation of writing data to source 102 and replicating to one or more clones 104-108 may be performed simultaneously by writer 116, the completion of the writing process may be completed at different times for source 102 and one or more clones 104-108. Furthermore, concurrent with the initiation of the process of writing data to source 102 and replication to one or more clones 104-108 associated with the first subset of write requests 1-4 is the saving of tracking information for a second subset of the received write requests, as will be described in greater detail below.

In block 306, during the parallel writing of data indicated by the first write requests, tracking information for a plurality of second write requests is saved to persistent storage, where the tracking information represents differences in data located on the source and data located on the clones indicated by the plurality of second write requests. Because replication manager 103 does not wait to complete the process of writing of data to source 102 and replicating to one or more clones 104-108 before persistently saving tracking information for a next subset of write requests, replication manager 103 may be said to parallel process and store tracking information for multiple write requests to multiple data storage devices. For example, referring to FIGS. 1 and 2, replication manager 103 persistently stores tracking information associated with write requests 5-8 prior to completing the process of writing data associated with write requests 1-4. In the embodiment illustrated in FIGS. 1 and 2, write requests 5-8 indicate a desire to write data "x" to extents 5-8 on source 102, which is replicated to one or more clones 104-108. Therefore, bits 5-8 in bitmap 112 corresponding to extents 5-8 on source 102 and clones 104-108 are changed from 0 to 1, indicating that data on extents 5-8 will be altered after processing write requests 5-8.

As described above with respect to block 302, bitmap 112 may be copied to persistent storage 114, and because the persistent logging of tracking information for multiple write requests may be a significant performance bottleneck for data replication systems that synchronize the completion of writing data for a first set of write requests and logging tracking information for a second set of write requests, the subject matter described herein for performing these operations in parallel alleviates this bottleneck thereby increasing the performance of the data replication system.

It will be understood that various details of the invention may be changed without departing from the scope of the invention. Furthermore, the foregoing description is for the purpose of illustration only, and not for the purpose of limitation.

What is claimed is:

1. A method of parallel processing and storing tracking information for multiple write requests, the method comprising:

in a data storage environment having a first volume of data denominated as a source being stored on a data storage system and at least a second volume of data denominated as a clone and which has data content that is a copy of data content of the source, the clone being stored on the data storage system or on another data storage system:

receiving a plurality of first write requests to write data to the source;

saving, to persistent data storage that is separate from the source and the clone, tracking information representing changes to be made to data located on the source and the clone, as indicated by the first write requests;

initiating parallel writing, to the source and the clone, the data indicated by the first write requests;

saving, to the persistent data storage during the parallel writing of data indicated by the first write requests, tracking information representing additional changes, as indicated by a plurality of second write requests, to be made to data located on the source and the clone.

2. The method of claim 1 wherein saving tracking information to persistent storage includes automatically saving to persistent storage a representation of changes to be made to data located on the source indicated by the first write requests.

3. The method of claim 1 wherein saving tracking information to persistent storage includes manually changing the tracking information saved in persistent storage.

4. The method of claim 1 wherein saving tracking information to persistent storage includes storing the tracking information in a bitmap having bits, where each bit represents a data storage extent on the source.

5. The method of claim 1 wherein saving tracking information to persistent storage includes saving the tracking information in two or more locations.

6. The method of claim 1 wherein initiating parallel writing of data indicated by the first write requests includes generating a plurality of threads of execution, at least one thread being generated to service each of the first write requests.

7. The method of claim 6 wherein generating a plurality of threads of execution includes dynamically generating a number of threads based on the demand to write input/output (I/O) to the source.

8. The method of claim 1 wherein initiating parallel writing of data includes communicating with a plurality of existing threads of execution, wherein at least one of the existing threads of execution services each of the first write requests.

9. The method of claim 1 wherein the source and the clone each reside on a disk within the same disk array.

10. The method of claim 1 wherein the source and the clone each reside on a disk with different disk arrays.

11. The method of claim 1 wherein the source and the clone each reside on a disk array including a redundant array of inexpensive disks (RAID).

12. A system for parallel processing and saving tracking information for multiple write requests, the system comprising:

a data storage system including:

a first volume of data denominated as a source being stored on a data storage system; and at least a second volume of data denominated as a clone which has data content that is a copy of data content of the source being stored on the data storage system or on another data storage system; and a replication and persistent storage manager for:

receiving a plurality of first write requests to write data to the source;

saving, to persistent data storage that is separate from the source and the clone, tracking information representing changes to be made to data located on the source and the clone indicated by the first write requests;

initiating parallel writing of data indicated by the first write requests; and saving to the persistent data storage during the parallel writing of data indicated by the first write requests, tracking information representing additional changes, indicated by a plurality of second write requests, to be made to data located on the source and the clone.

13. The system of claim 12 wherein the replication and persistent storage manager is configured to automatically save to persistent storage a representation of changes to be made to data located on the source indicated by the first write requests.

14. The system of claim 12 wherein the replication and persistent storage manager is configured to provide for manually changing the tracking information saved in persistent storage.

15. The system of claim 12 wherein the replication and persistent storage manager is configured to store the tracking information in a bitmap having bits, each bit representing a data storage extent on the source.

16. The system of claim 12 wherein the replication and persistent storage manager is configured to save the tracking information in two or more locations.

17. The system of claim 12 wherein the replication and persistent storage manager is configured to generate at least two threads of execution, at least one thread being generated being configured to service each of the first write requests.

18. The system of claim 17 wherein the replication and persistent storage manager is configured to dynamically generate a number of threads based on the demand to write input/output (I/O) to the source.

19. The system of claim 12 wherein the replication and persistent storage manager is configured to communicate with a plurality of existing threads of execution, wherein at least one of the existing threads of execution services each of the first write requests.

20. The system of claim 12 wherein the source and the clone each reside on a disk within the same disk array.

21. The system of claim 12 wherein the source and the clone each reside on a disk with different disk arrays.

22. The system of claim 12 wherein the source and the clone each reside on a disk array including a redundant array of inexpensive disks (RAID).

23. A computer program product comprising computer-executable instructions embodied in a computer-readable medium for performing steps comprising:

in a data storage environment having a first volume of data denominated as a source being stored on a data storage system and at least a second volume of data denominated as a clone and which has data content that is a copy of data content of the source, the clone being stored on the data storage system or on another data storage system:

receiving a plurality of first write requests to write data to the source;

saving, to persistent data storage that is separate from the source and the clone, tracking information representing changes to be made to data located on the source and the clone indicated by the first write requests;

initiating parallel writing of data indicated by the first write requests to the source and to the at least one clone; and saving to the persistent data storage during the parallel writing of data indicated by the first write requests, tracking information representing additional changes, as indicated by a plurality of second write requests, to be made to data located on the source and the clone.

* * * * *